July 2, 1963  S. S. DAVIS ET AL  3,096,280
FILTER APPARATUS
Filed April 8, 1959  5 Sheets-Sheet 1
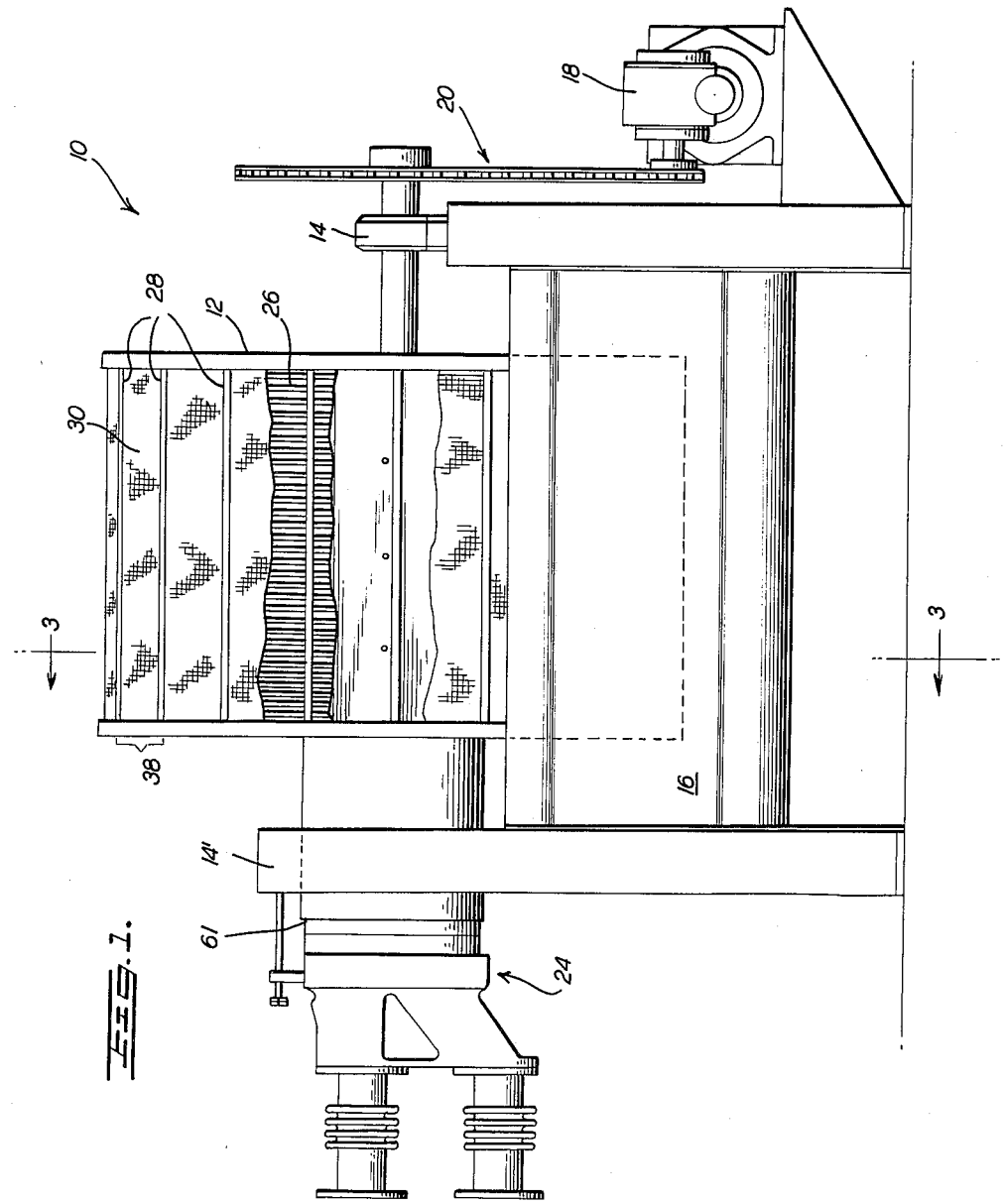
INVENTORS,
STEVEN S. DAVIS
KENT L. DAVIS
BY
ATTORNEYS

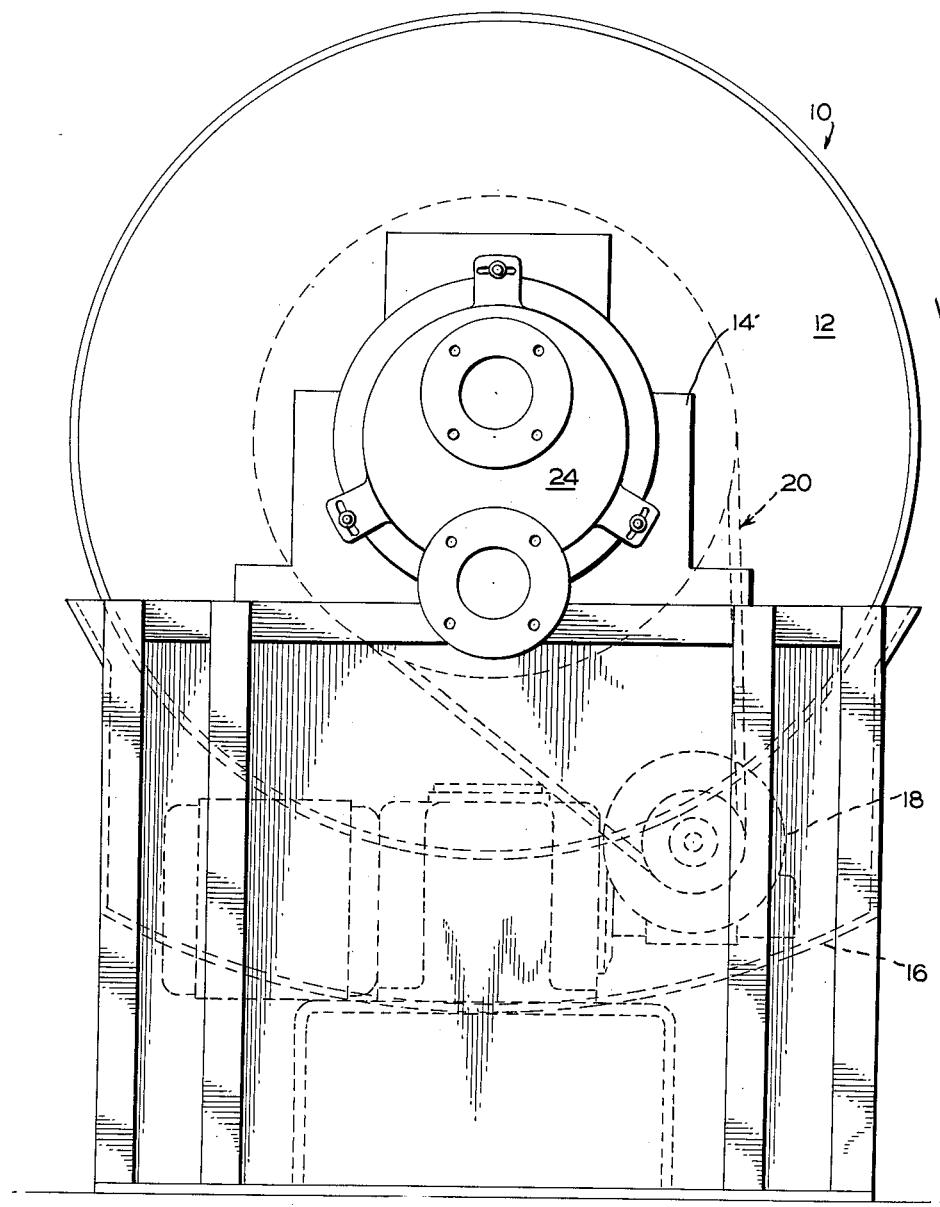

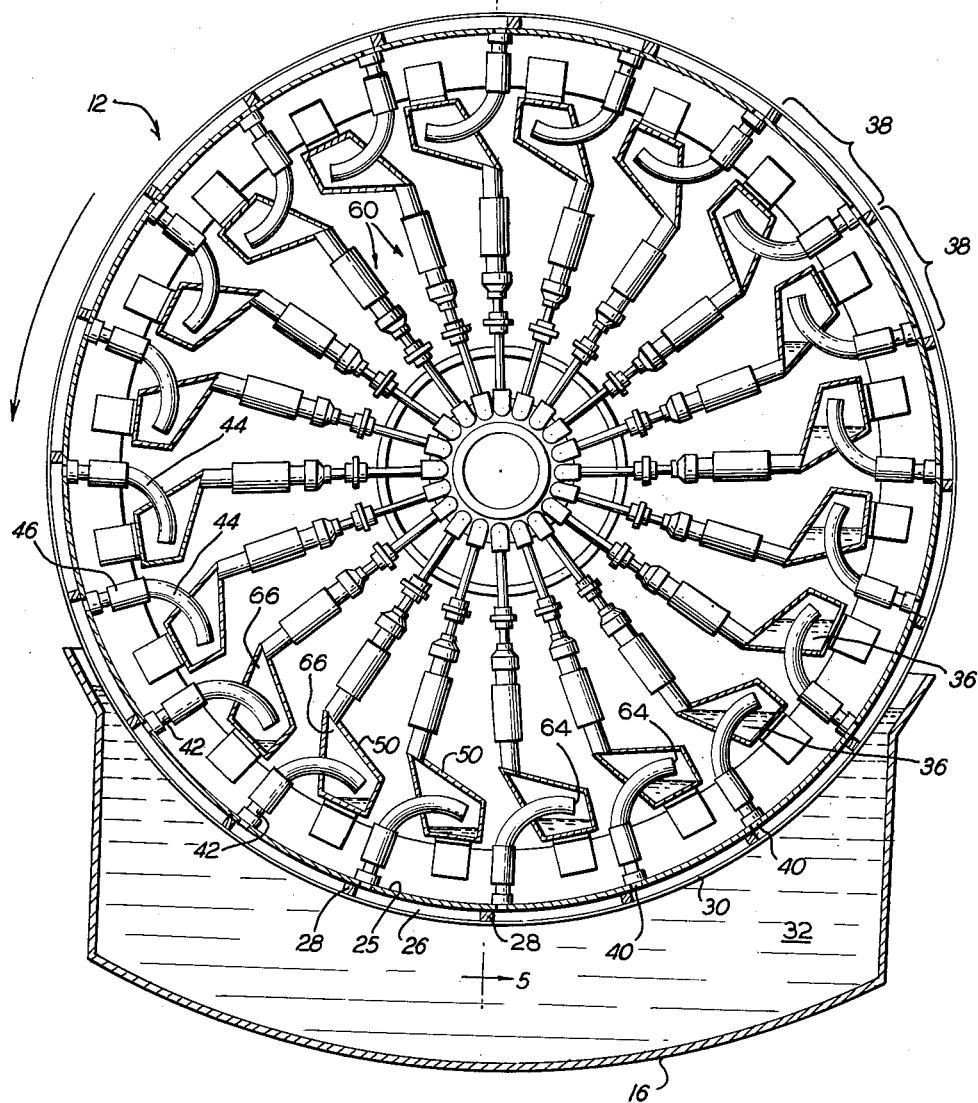

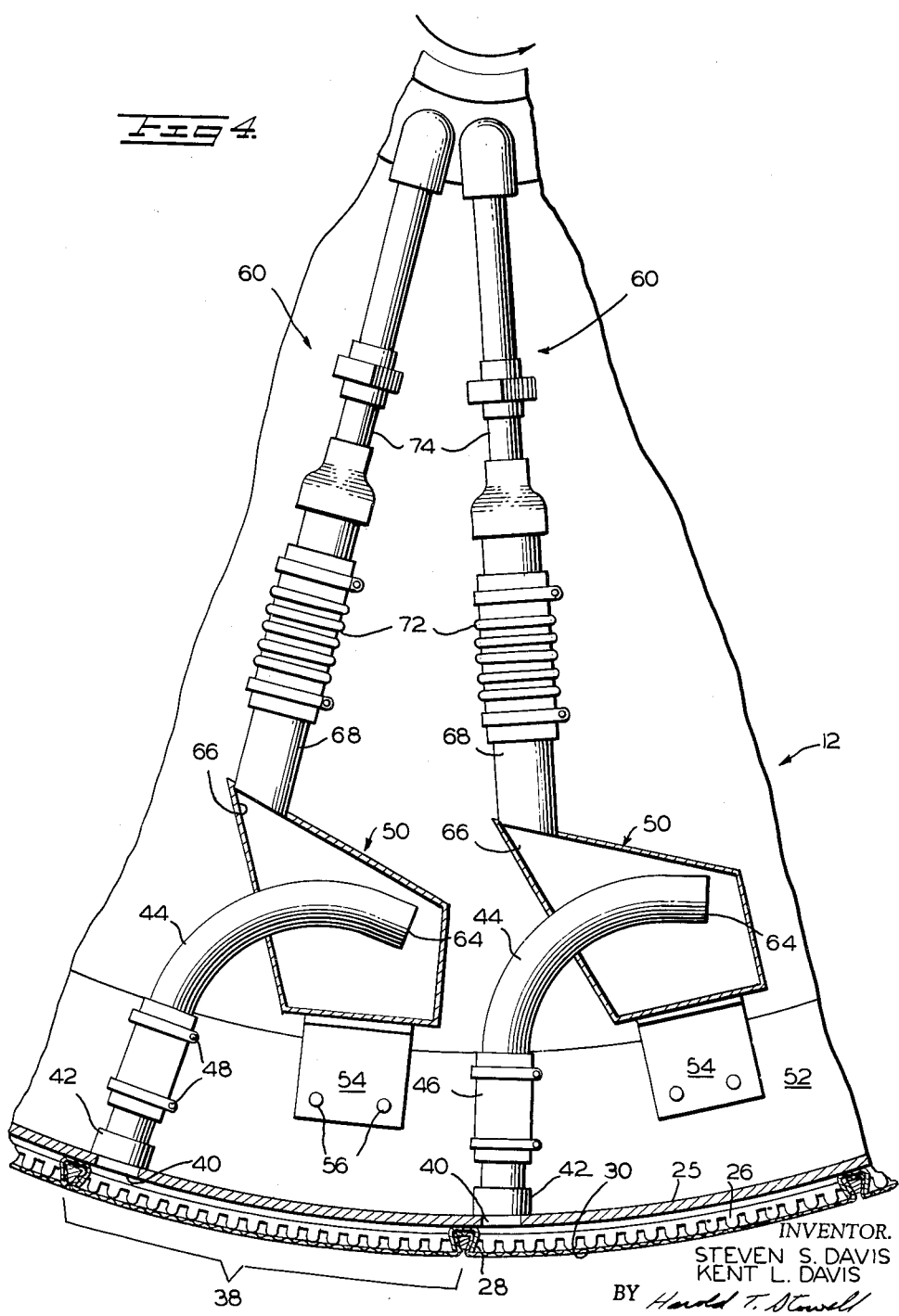

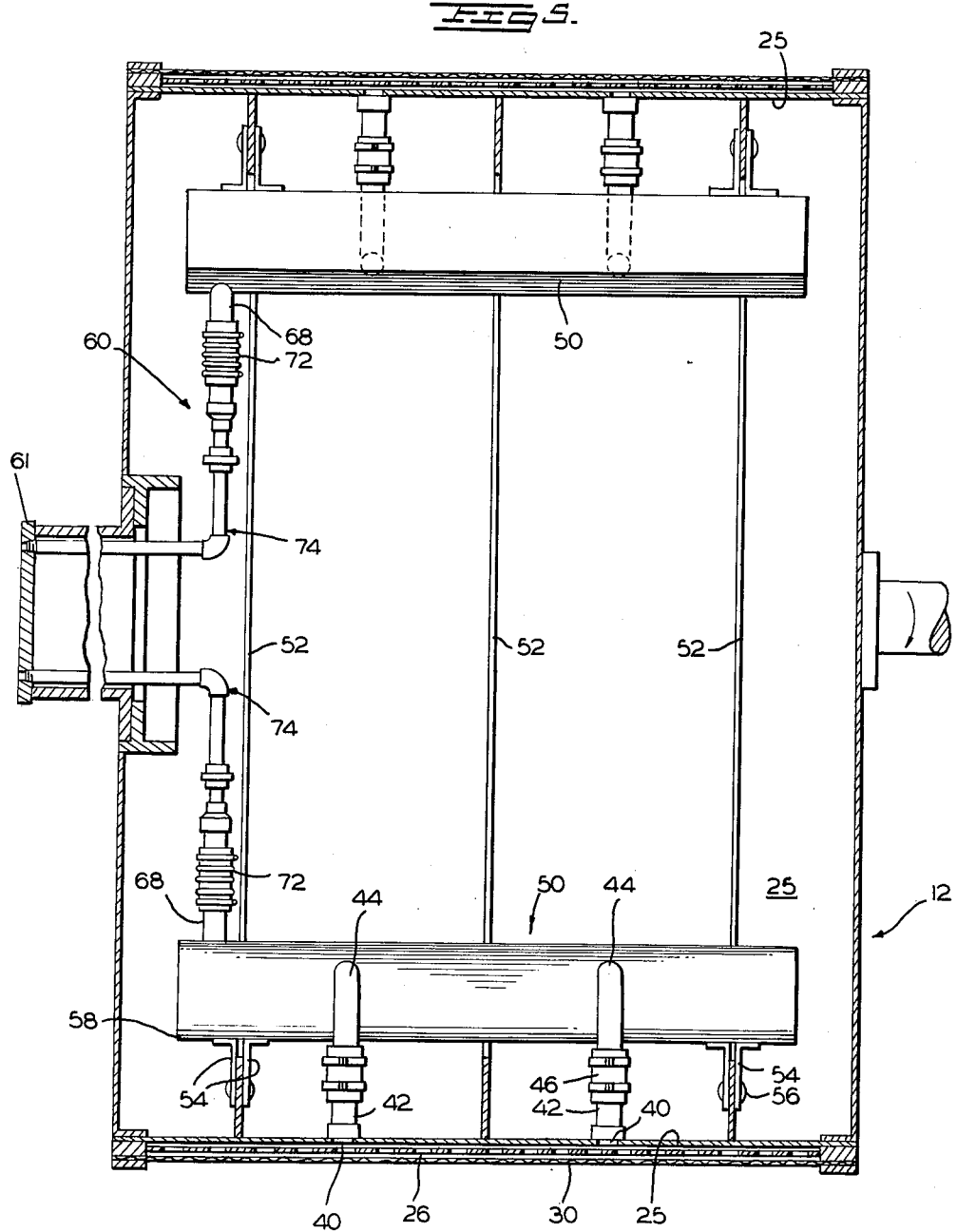

3,096,280
FILTER APPARATUS
Steven S. Davis, Bountiful, and Kent L. Davis, Salt Lake City, Utah, assignors to The Eimco Corporation, Salt Lake City, Utah, a corporation of Delaware
Filed Apr. 8, 1959, Ser. No. 804,973
1 Claim. (Cl. 210—404)

This invention relates to improvements in rotary drum filters of the vacuum type and, more particularly, to such filters having filtrate reservoir structures which minimize loss of effective vacuum due to resistance to the flow of gas and liquids through piping connecting filter sectors to the source of reduced pressure and loss incurred in lifting the filtrate from the filter sectors deep in the filter cake forming zone of the filter.

The invention has particular application in the filtration of slurries wherein the liquid component or a portion thereof has a low boiling point or is processed at a temperature approaching its boiling point. In handling such slurries and the resulting filtrate, it is necessary that the reduced pressure employed in forming the filter cake and drawing the filtrate from the low sectors of the drum filter through the filter valve structure be greater than the pressure at which the filtrate will flash vaporize. It has been found that it is often not possible to operate conventional drum type vacuum filters where the filtrate comprises a low boiling point liquid as the reduced pressure necessary to form a filter cake and draw the filtrate through the filter piping cause the filtrate to flash vaporize. Deep filter decks or larger piping have not proved to be suitable solutions to the problem as larger piping does not eliminate loss of effective vacuum due to lifting the filtrate and deep decks in many instances present filtrate run-back problems as each drum sector moves out of the slurry.

It is, therefore, a major object of the present invention to provide a vacuum type filter for slurries having a low boiling point liquid component.

Another object is to provide a vacuum filter having means for gravity filtrate drainage to aid the suction or reduced pressure in discharging filtrate.

A further object is to provide a drum type vacuum filter having improved cake forming and filtrate removing properties.

Another object is to provide means for maintaining adjacent the filter deck substantially the maximum available and permissible suction.

Another object is to minimize suction loss due to fluid flow resistance in the piping of drum filters.

Another object is to minimize suction loss in lifting filtrate from drum filter sectors deep down in the filter cake pickup zone.

These and other objects and advantages are provided in a rotary drum filter having a filter medium supporting deck, means dividing the deck into a plurality of filter sectors, a container mounted adjacent each filter sector, and conduit means providing communication between each filter sector and its adjacent container and between each container and a source of reduced pressure.

The invention will be more particularly described with reference to the accompanying drawings wherein:

FIG. 1 is a front view of a rotary drum filter which uses the improved filtrated reservoir system;

FIG. 2 is the valve end view of the filter shown in FIG. 1;

FIG. 3 is a partial sectioned view taken from line 3—3 of FIG. 1 showing detail of the drum and the filtrate reservoir system;

FIG. 4 is an enlarged detail view of a filtrate reservoir as seen in FIG. 3; and FIG. 5 is a cut-away and sectioned view of the filter taken from line 5—5 of FIG. 3 showing two filtrate reservoirs with piping.

Referring to FIGS. 1 and 2, a rotary drum filter 10 is shown which may utilize any of the improved filtrate reservoir systems of the invention. Drum 12 of the rotary drum filter is rotatably supported by conventional bearing means 14 and 14' for successively passing sections of the drum deck through slurry 32 maintained in tank 16. Drum filter 10 is also shown to have a drive motor 18 and drive train means 20 and a conventional filter valve 24. Although the improved filtrate reservoir systems of the invention are primarily intended for vacuum drum filters the systems may be used with pressure filters in which case the structures of the illustrated vacuum drum filter, filtrate reservoirs, drum and slurry tank would be contained within a pressure vessel. Further, the improved filtrate reservoir systems may be used with drum filters employing endless belt type filter media, wherein successive portions of the media leave the drum for cake discharge and pass about other rollers to be returned to the drum before re-entering the slurry.

Filter drum 12 is provided with a filter deck 25 which supports thereon filtrate drainage grids 26 of a conventional nature. Filtrate drainage grids 26 are held in place on the drum deck 25 by division strips 28 which also separate adjacent drainage grids 26 into separate filtrate drawing and drainage sectors 38. Drainage grids 26 and division strips 28 extend longitudinally across the drum 12 from end to end thereof and comprise the plural filter sectors.

A filter medium 30 is conventionally supported upon the outer face of the filtrate drainage grids 26 and when the medium passes through the slurry 32 a deposit of filter cake forms thereon and filtrate 36 passes therethrough. Each filtrate drainage sector 38 defined by a drainage grid 26 and its respective division strips 28 is provided with at least one opening 40 at the trail end thereof as related to the direction of rotation of the filter drum. Rotation of the filter drum 12 of the illustrated embodiment is shown to be in a counter clockwise direction in accordance with the direction arrows as seen in FIGS. 3 and 4. Each opening 40 in drum deck 25 is provided with a standard nipple and coupling structure 42 each of which, in the embodiment of FIG. 3, is connected to a respective curved or angled pipe 44 by a flexible hose connection 46 which is tightened in place on its respective nipple 42 and pipe 44 by screw clamps 48. Each nipple and coupling 42, flexible connecting hose 46 and pipe 44 are provided for drawing filtrate from the respective filtrate drainage sector 38 to the respective filtrate reservoir 50.

Thus, it will be seen that a filtrate reservoir 50 is provided within the drum 12 for each filter sector 38. Filtrate reservoirs 50 of the illustrated embodiment extend longitudinally along the interior of drum 12 through a great portion of the length thereof and are mounted to various drum reinforcing ribs 52 by flange means 54 fastened thereon by conventional means such as by welding or by rivets 56. Filtrate reservoirs 50 may be so mounted in drum 12 by flange means 54 that each filtrate reservoir slopes gently inward towards the rotational axis of drum 12, as the drainage end 58, is approached to insure more complete drainage of filtrate from the reservoirs 50 as each is rotated into a position with drum 12 for drainage of filtrate through its respective filtrate drainage line means 60. The filtrate drainage lines 60 connect each reservoir with the port means 61 in the conventional filter valve 24.

Referring also to FIGS. 3, 4 and 5, filtrate reservoirs 50 are shown to be trapezoidal in cross section. However, other regular and/or irregular reservoir shapes could be used to accomplish the same ends. In the illustrated embodiment of FIG. 3, however, each filtrate reservoir 50 is so shaped and arranged in conjunction with its filtrate drainage and vacuum line 60 and its filtrate line means including pipe 44 from its filtrate drainage sector 38, that when the filtrate drainage sector 38 is in the slurry of tank 16 and vacuum is drawing filtrate to the reservoir, generally the only hydraulic head that must be overcome by vacuum exerted through line 60 is that needed to draw the liquid to the height for discharge from pipe 44 to the reservoir. This filtrate head may actually in many instances be more than overcome or balanced by the submergence of the filter sectors in the slurry in tank 16. Additional vacuum available is useful in drawing filtrate through media 30 and filter cake being formed thereon.

As filtrate is drawn up and through a pipe 44 and into a filtrate reservoir 50 it falls away from the outlet end 64 of the pipe 44. The reservoir capacities are so selected that filtrate, drawn through the filter media of the respective filter drainage sectors 38 during each pass through the slurry, generally does not rise in the reservoirs 50 to the outlet ends 64 of the respective pipes 44 whereby for all positions of the respective reservoir 50, pipe end 64 is free of and above the surface of filtrate contained within the reservoir. Then as each filtrate sector 38 and the respective filter reservoir 50 rotates in progression with drum 12 from a lower position to a position approximately 90 degrees therefrom, such as illustrated in FIG. 3, the filtrate begins to drain from the acute angle 66 in the trapezium shape of the reservoir 50. This flow by gravity as assisted by vacuum pull through the filtrate vacuum line 60 also helps take maximum advantage of vacuum pull available within limits imposed by the low boiling points of the various filtrates encountered during filter cake washing and drying. Filtrate reservoirs 50 are shaped for one direction of rotation and must therefore be reversed for proper action and drainage in a filter with drum 12 rotating in the opposite direction.

Each filtrate drainage line 60 comprises a pipe 68 secured to the apex angle portion 66 of its reservoir 50, a flexible hose means 72 having one end connected to the extended end of the pipe 68 and the other end connected to piping 74 extending from the flexible hose means 72 to the port plate means 61 of the filter valve structure 24. With each take-off or vacuum line 60 interconnecting a reservoir 50 with the port means 61 of the conventional rotary filter valve 24, rotation of the drum 10 provides successive predetermined connection of the filtrate reservoirs with a source of reduced pressure, atmosphere or, where desired, to blow pressure, during successive portions of the filtration cycle.

What we claim and desire to secure by Letters Patent is:

In a rotary drum filter having a deck including means for supporting a filter medium in spaced relationship therefrom, means dividing the space between the deck and the filter medium into a plurality of filter sectors, means for rotating the drum to successively pass the filter sectors through a slurry to be filtered, means connecting each of the filter sectors to a source of reduced pressure, said connecting means comprising a filtrate storage container, the volume of the storage container being substantially greater than the volume of its respective filter sector whereby the container will hold substantially all of the filtrate removed from a sector during a cycle of operation, said storage container being mounted adjacent each filter sector inwardly of the deck, said containers being positioned to receive and store filtrate out of contact with the filter medium during filter cake formation on the filter medium, conduit means having one end in communication with a filtrate outlet opening in the deck portion of each filter sector, each of the filtrate outlet openings being positioned adjacent only the trailing edge of the respective filter sectors with respect to the direction of rotation of the drum filter whereby as soon as the filter sectors begin to emerge from the slurry gravity assists in the flow of filtrate from the filtrate outlet openings, the other end of said conduit means having communication with the container mounted adjacent its filter sector and extending inwardly of the radially outermost wall thereof to position the outlet radially inwardly of the maximum liquid level of said container thereby to prevent return flow of filtrate to the respective filter sector, and further conduit means having one end connected at radially inner trailing edge portion of each container and the other end of said further conduit means connected to the source of reduced pressure.

References Cited in the file of this patent
UNITED STATES PATENTS

| | | |
|---|---|---|
| 2,092,111 | Dons et al. | Sept. 7, 1937 |
| 2,321,230 | Mills et al. | June 8, 1943 |
| 2,696,309 | Bultman | Dec. 7, 1954 |
| 2,793,755 | Richards | May 28, 1957 |
| 2,889,931 | Buttolph | June 9, 1959 |